(12) United States Patent
Bruce et al.

(10) Patent No.: US 8,870,249 B2
(45) Date of Patent: *Oct. 28, 2014

(54) VEHICLE TIE-DOWN DEVICE FOR HAULING A LOAD

(71) Applicant: Global Consumer Products Inc., Hudson, IL (US)

(72) Inventors: Gail Bruce, Charlotte, NC (US); Bob A. Schouten, Southlake, TX (US); Connie S. Schouten, Southlake, TX (US); David Voigts, Hudson, IL (US); Reid Alan Bruce, Dekalb, IL (US)

(73) Assignee: Global Consumer Products, Inc., Hudson, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,191

(22) Filed: Aug. 23, 2013

(65) Prior Publication Data

US 2013/0334828 A1   Dec. 19, 2013

Related U.S. Application Data

(63) Continuation of application No. PCT/US2012/026547, filed on Feb. 24, 2012, which is a continuation-in-part of application No. 13/034,013, filed on Feb. 24, 2011, now Pat. No. 8,616,593.

(51) Int. Cl.
*E05C 17/04* (2006.01)
*B60P 7/08* (2006.01)
*E05C 17/00* (2006.01)

(52) U.S. Cl.
CPC ............. *B60P 7/0823* (2013.01); *E05C 17/042* (2013.01); *Y10S 292/42* (2013.01)

USPC ................... 292/262; 292/288; 292/DIG. 42; 24/298

(58) Field of Classification Search
USPC ......................................... 292/288
See application file for complete search history.

(56) References Cited

U.S. PATENT DOCUMENTS

| 2,973,217 A | 2/1961 | Gregoire |
| 2,974,989 A | 3/1961 | Hilbers |
| 3,011,818 A | 12/1961 | Matthiessen |

(Continued)

FOREIGN PATENT DOCUMENTS

| JP | 4063778 A | 2/1992 |
| WO | 2012/154273 A2 | 11/2012 |

OTHER PUBLICATIONS

International Search Report and Written Opinion in counterpart International Application No. PCT/US2012/026547 dated Nov. 30, 2012, pp. 1-10.

(Continued)

*Primary Examiner* — Carlos Lugo
(74) *Attorney, Agent, or Firm* — Additon, Higgins & Pendleton, P.A.

(57) ABSTRACT

The invention provides tie-down devices and related methods for securing oversized items in a vehicle trunk or rear storage compartment in preparation for transport. The tie-down devices include sections connected by a releasable buckle that allows for separately cinching the strap sections to desired lengths. The tie-down devices incorporate specialized connectors at each end in the form of at least one grip that is curved to attach to the edge of a panel on the vehicle and a latch that attaches to a fixed attachment mechanism at the opposite end.

4 Claims, 14 Drawing Sheets

(56) References Cited

U.S. PATENT DOCUMENTS

| | | |
|---|---|---|
| 3,674,299 A | 7/1972 | Kelly |
| 3,971,589 A | 7/1976 | Elrod |
| 4,070,050 A | 1/1978 | Glock et al. |
| 4,124,240 A | 11/1978 | Adelberg |
| 4,188,061 A | 2/1980 | Shehi |
| 4,191,413 A | 3/1980 | Barner |
| 4,307,907 A | 12/1981 | Barrowman et al. |
| 4,659,122 A | 4/1987 | Miller |
| 4,666,194 A | 5/1987 | Charman |
| 4,667,993 A | 5/1987 | Hannesson et al. |
| 5,163,724 A | 11/1992 | Conte |
| 5,228,737 A | 7/1993 | Zimmerman |
| 5,297,828 A | 3/1994 | Chung |
| 5,320,398 A | 6/1994 | Popp et al. |
| D375,891 S | 11/1996 | Bailey et al. |
| 5,647,619 A | 7/1997 | DeLisio |
| 6,029,941 A | 2/2000 | Mayzes |
| 6,428,062 B1 | 8/2002 | Roehl |
| 6,648,381 B2 | 11/2003 | Holton et al. |
| 6,938,881 B2 | 9/2005 | Grapes |
| 2006/0177282 A1 | 8/2006 | Blosser |
| 2007/0181622 A1 | 8/2007 | Rocchio |
| 2009/0167048 A1 | 7/2009 | Luca et al. |
| 2012/0217762 A1 | 8/2012 | Bruce |

OTHER PUBLICATIONS

International Preliminary Report on Patentability in counterpart International Application No. PCT/US2012/026547 dated Aug. 27, 2013, pp. 1-6.

VEHICLE TIE-DOWN DEVICE FOR HAULING A LOAD

CROSS REFERENCE TO RELATED APPLICATIONS

This application is a continuation of International Application No. PCT/US2012/026547 filed on Feb. 24, 2012, which is a continuation-in-part of patent application Ser. No. 13/034,013 for the Vehicle Tie-Down Device for Hauling a Load filed on Feb. 24, 2011. The prior applications are incorporated by reference in their entirety.

FIELD OF THE INVENTION

The present invention relates to devices and associated methods for securing oversized items in a vehicle trunk or rear storage compartment in preparation for transport and, in particular, to vehicle tie-down devices which mount at least partially about the exterior portion of a vehicle trunk or rear hatch.

BACKGROUND

Automobiles, sport utility vehicles (SUV's), vans, and other types of vehicles are commonly used to transport objects or items that are too large to fit within the trunk or rear storage compartment of the vehicle and therefore protrude out of the trunk, rear hatch, or rear storage compartment. In this situation, the trunk or rear hatch lock mechanism cannot be latched or locked and must be left unsecured during transport.

Various means have typically been utilized to keep the trunk or rear hatch compartment secured during transport of the oversized load or oversized item. These means and methods include utilizing elastic bungee cords or tying the trunk or rear hatch down with straps, rope, or twine to keep the trunk lid or rear hatch secured onto the protruding item or oversized load during transport. Securing and transporting an oversized load using these traditional means and methods is difficult because convenient and secure tie-down points do not exist on the exterior of most vehicles. Not only are conventional means and methods inconvenient and difficult to utilize, particularly for shoppers or other users that may not be mechanically inclined, use of these methods can result in damage to the oversized item or to the vehicle itself. For instance, damage may occur due to bouncing of the trunk lid or rear hatch during transport, chafing of the vehicle paint from the tie-down means, or even having the oversized item or load become unsecured and falling from the vehicle.

Various devices have been developed to address the problem of securing and transporting oversized items or loads within a vehicle trunk. To date, these devices have not been commercially accepted. These devices suffer from design limitations and, when contrasted with the instant device, are more difficult to install and more expensive to manufacture.

One category of such devices act not only to secure oversized items or loads within a vehicle trunk, but also to hold up the trunk at a desired angle during transport. Such devices include those described within U.S. Pat. No. 5,228,737 to Zimmerman, U.S. Pat. No. 4,124,240 to Adelberg, U.S. Pat. No. 4,307,907 to Barrowman, U.S. Pat. No. 5,163,724 to Conte, U.S. Pat. No. 4,070,050 to Glock, U.S. Pat. No. 2,973,217 to Gregoire, U.S. Pat. No. 4,667,993 to Hannesson, U.S. Pat. No. 2,974,989 to Hilbers, U.S. Pat. No. 3,674,299 to Kelly, U.S. Pat. No. 6,029,941 to Mayzes, and U.S. Pat. No. 6,428,062 to Roehl. The rigid support structures of these devices are more complicated in design and operation when contrasted with the instant invention. Further, such devices are more difficult and expensive to manufacture than the instant vehicle tie-down device.

Other devices designed to secure oversized items or loads within a vehicle trunk incorporate strap-based concepts, but such devices also require a retractable mechanism in order to secure the vehicle trunk against the oversized item or load. Such devices include those described within U.S. Pat. No. 5,320,398 to Popp, U.S. Pat. No. 3,971,589 to Elrod, U.S. Pat. No. 4,659,122 to Miller, and U.S. Pat. No. 4,188,061 to Shehi. These devices are more complicated in design and operation than the instant invention due to the retractable securing component incorporated within the devices. Moreover, such devices do not mount on an external portion of a vehicle trunk or rear hatch.

Another category of devices utilizes adjustable straps and mounts solely about the internal portion of a vehicle trunk. Such devices include those depicted and described within U.S. Pat. No. 6,648,381 to Holton, U.S. Pat. No. D375,891 to Bailey, U.S. Pat. No. 4,191,413 to Barner, U.S. Pat. No. 4,666,194 to Charman, U.S. Pat. No. 5,297,828 to Chung, and U.S. Pat. No. 5,647,619 to DeLisio. Unlike the present device, these devices cannot mount at a convenient external attachment point about the vehicle.

Due to the limitations of traditional and previously developed means and methods for securing an oversized item or load within a vehicle trunk or rear storage compartment, there exists a current need for more efficient and effective devices and methods for securing an oversized item or load within a vehicle trunk or rear storage compartment during transport.

SUMMARY OF THE INVENTION

Accordingly, in one aspect, the present invention is a vehicle trunk or rear hatch tie-down device that facilitates efficient transport of oversized loads in the trunk or rear storage compartment of a vehicle. The device avoids the limited access available inside a storage area such as a car trunk.

In an exemplary embodiment, the vehicle tie-down device includes two adjustable length strap portions that attach to each other to complete the device. One end of a first strap portion has a grip that is attachable about an edge of the vehicle's trunk lid, rear hatch, or cargo doors.

In one embodiment, the grip fits within a gap or void space between a hinged panel of a trunk lid or rear hatch and an adjacent part of the vehicle (i.e., the space that is formed at the hinged edge when the trunk or rear hatch is opened). At a second end of the tie-down device, opposite the grip, a hook or latch attaches to a fixed attachment point within the trunk or rear hatch (e.g., the strike portion of the trunk or any clip, hook, ring, or loop that is fixed within the cargo area of the vehicle). The latch or hook at this second end of the tie-down device is adapted to be attached and detached as necessary to use the tie-down device (e.g., a slide clip or pinch clip opens and closes about the fixed attachment point).

In a related aspect, the present invention is a convenient means for securing an oversized item or load for transport in a vehicle trunk or rear storage compartment using the aforementioned vehicle tie-down device. The two piece structure of the vehicle tie-down device allows for an easy to reach, adjustable connection point for securing the trunk or rear hatch of the vehicle for transport. The connection point and adjustable buckle are positioned on the exterior of the vehicle to avoid cumbersome connections inside a trunk that is already full with the load being hauled.

In another aspect, the present invention is a simple to use vehicle tie-down device that requires no special skills or mechanical aptitude to install and secure the trunk or rear storage compartment because of the external attachment of the device about the vehicle.

In yet another aspect, the present invention is adaptable to various vehicle trunk or rear hatch configurations on a range of vehicle types.

In yet another aspect, the present invention is a vehicle tie-down device that protects the vehicle by incorporating padding or other means to prevent chafing or scratching of the vehicle's paint. The present invention may also provide a protective mechanism to prevent the trunk lid or rear hatch from slamming down onto the latch strike when the vehicle tie-down is installed.

The foregoing, as well as other objectives and advantages of the invention and the manner in which the same are accomplished, are further specified within the following detailed description and its accompanying figures.

DETAILED DESCRIPTION

Figure 1:
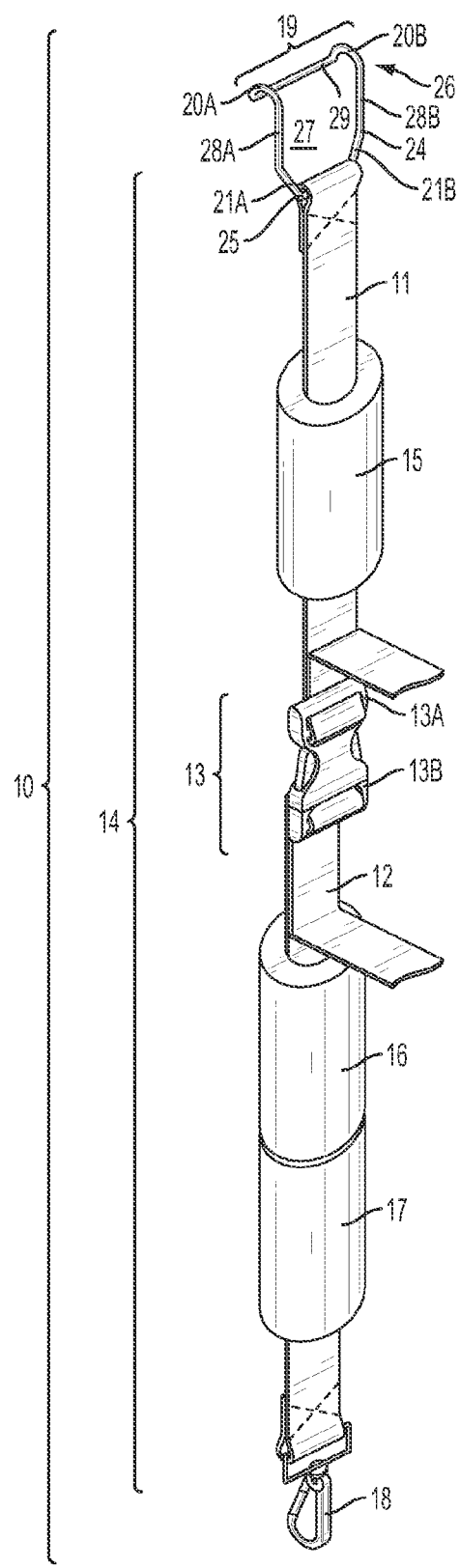
FIG. 1 is a perspective view of the vehicle tie-down device according to the present invention.
Figure 2:
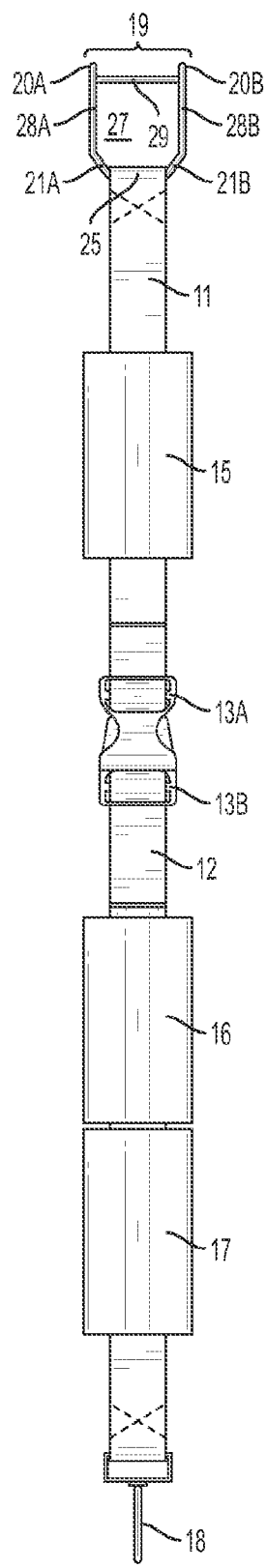
FIG. 2 is a front plan view of the vehicle tie-down device according to the present invention.
Figure 3:
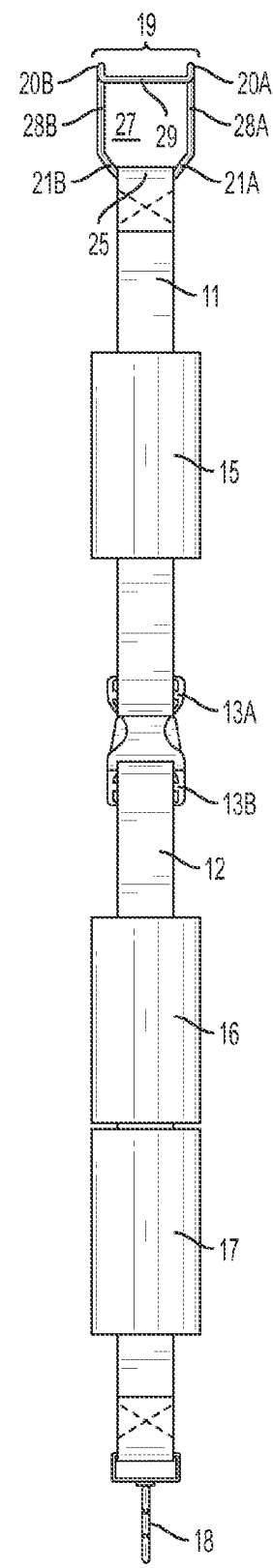
FIG. 3 is a rear plan view of the vehicle tie-down device according to the present invention.

The present vehicle tie-down device facilitates efficient and secure transport of oversized items or loads hauled by a vehicle, particularly loads extending at least partially within the storage compartment of a vehicle. Without limiting the invention in any way, this detailed description utilizes the following terms, which should be construed in the broadest sense:

A tie-down device (10) refers to the overall mechanism used to hold a trunk lid, rear hatch, a lift gate, a back door, a hatch back, a tail gate, or a side door in a fixed position while carrying cargo. Although the drawings show the tie-down device as having two separable strap portions, the invention encompasses embodiments with a single strap. The opposite ends of the tie-down device (10) are secured to the vehicle (8).

A load (5) refers to any item hauled by a vehicle and carried at least partially within the storage compartment (33) of a vehicle (8) and made more secure by the tie-down device (10).

A vehicle is any machine or device used to transport people and/or objects, including, but not limited to all kinds of trucks, automobiles, sports utility vehicles, all terrain vehicles, farm machinery, tractors, lawn mowers, trains, boats, airplanes, and the like. The description below relies on automobiles only as examples and does not limit the invention or its use to any one kind of vehicle.

A vehicle closure panel (30) is a section of a vehicle (8) that opens and closes to allow placement of a load (5) into the vehicle. Vehicle closure panels (30) include, but are not limited to trunk lids, rear hatch doors, cargo doors, lift gates, back doors, hatch backs, tail gates, side doors or any structure in a vehicle that allows access to a storage compartment within the vehicle. Vehicle closure panels (30) are often hinged for easy access.

A fixed attachment mechanism (22) refers to any secure point on or inside a vehicle that is adapted to allow a latch or strap to connect to the vehicle. A fixed attachment mechanism (22) may include, but is not limited to, the strike portion (22A) of a vehicle trunk (35) that is ordinarily used to hold a trunk lid (37) in a closed position. Other vehicles may incorporate rings, loops, clips, or even posts that allow for attaching a tie-down device to a fixed attachment mechanism.

A grip (19) refers to any structure attached to a tie-down device (10) as set forth herein and adapted for connecting around another fixed structure, such as a vehicle closure panel (30) or even another strap. The term grip should be construed in its absolute broadest sense and encompasses all shapes, designs, and structures that hold on to another device and allow for tension to be applied in a direction opposite the grip. In one embodiment that does not limit the invention, the grip (19) is a device for holding on to another fixed structure without additional fasteners and can be manually released from its attachment.

As noted above, the tie-down device (10) is characterized in part by its installation around the outside of a portion of a vehicle (8). Positioning a tie-down device (10) outside a storage compartment (33) of a vehicle allows the user to avoid cramped spaces and unstable attachment points inside a vehicle, particularly tight spaces within a storage compartment (33) that is already mostly full with a load (5). In its broadest sense, the tie-down device (10) includes a grip (19) that attaches around an edge (31) of a vehicle closure panel (30) such as a trunk lid (37). The tie-down device (10) holds the vehicle closure panel (30) in close proximity to the load (5) when the load prevents securely closing a storage compartment (33) in a vehicle. The grip (19) includes a "claw" shape that mimics a human hand grasping an edge (31) and attaches to a vehicle closure panel (30) in the absence of additional fasteners holding the grip to the vehicle (i.e., the grip (19) is entirely functional without additional screws, bolts, clips and the like). The grip (19) includes a curved portion (26) that actually wraps around an edge (31) of a vehicle closure panel (30) and holds the tie-down device (10) in place. The grip (19), therefore, allows the user to exert tensional forces on an associated strap (14) such that the tensional forces pull on the grip (19) with the grip (19) applying an oppositely directed force by bracing against the vehicle closure panel (30). The grip (19) may be coated with a protective layer or padded in some other way to prevent the grip from damaging the finish on a vehicle.

Many different shapes and designs for the grip (19) are encompassed within this description. The drawings associated with this detailed description illustrate one convenient design, but the shape of the grip (19) is not limited to only one shape. Overall, the shape of the grip (19) gives it a "claw-like" quality, allowing the grip (19) to attach to a vehicle by utilizing a curved portion (26) of the grip (19) and grabbing an edge (31) of a vehicle closure panel (30). In one exemplary embodiment, the curved portion (26) wraps around at least a part of that edge to stay in place. The grip (19) may be magnetic to ensure that the grip stays in place more effectively.

The grip (19) may have an open construction with a single piece body (24) shaped into a desirable form and defining an opening (27) therein. Accordingly, in one embodiment, a single piece body (24) defines the curved portion (26), side portions (28A, 28B), a connector portion (29), and a strap attachment portion (25). The strap attachment portion is positioned oppositely the curved portion (26) of the grip (19) and allows a strap (14) to wrap around the strap attachment portion of the grip (19). The strap (14), therefore, may be fixed to the grip (19) along the strap attachment portion (25) of the grip (19). In one embodiment, the strap (14) is looped around the strap attachment portion (25) of the grip (19) and fixed thereto with appropriate stitching (shown as an "X" design in FIG. 1).

The tie-down device (10) offers numerous advantages due to the engineering incorporated into its design. As noted above, the grip (19) wraps around an edge (31) of a vehicle closure panel (30) and allows an attached strap (14) to extend across an outer surface of the vehicle closure panel. In order to allow for more customization in the size of the tie-down device (10) and adapt the device to a larger variety of vehicles, one embodiment of the tie-down device (10) incorporates a strap (14) that is divided into two sections (11, 12) connected by a releasable buckle (13). The buckle (13) has a male section (13A) that connects to and disconnects from a female section (13B), both of which allow for cinching respective strap sections (11, 12). This cinching process allows the user to size the overall tie-down device (10) for the vehicle at issue.

By engineering the tie-down device (10) into sections, therefore, the tie-down device (10) is adapted for easier installation onto more kinds of vehicles of varying sizes. The sectional construction allows for installing the upper end grip (19) to a vehicle closure panel (30) and sizing the first section (11) of the tie-down device (10) so that the buckle (13) is in a convenient location. The user then connects the second section (12) to a fixed attachment mechanism (22) in the storage compartment (30) of the vehicle (8), attaches the buckle portions (13A, 13B) and cinches both sections (11, 12) to their appropriate lengths. Because the buckle (13) has been placed in a previously determined position on the vehicle, the tie-down device (10) allows for a quick and convenient disconnecting process so that the tie-down device can be removed very easily. After all, disconnecting a buckle (13) positioned in a desirable location on a vehicle is much easier than attempting to untie knotted cords, or unhooking standard bungee cords that may have been placed in hard to reach areas adjacent the load. The convenient disconnect allows for removing the tie-down device (10) without damaging it; therefore, the tie-down device is a reusable piece of equipment.

Figure 8:
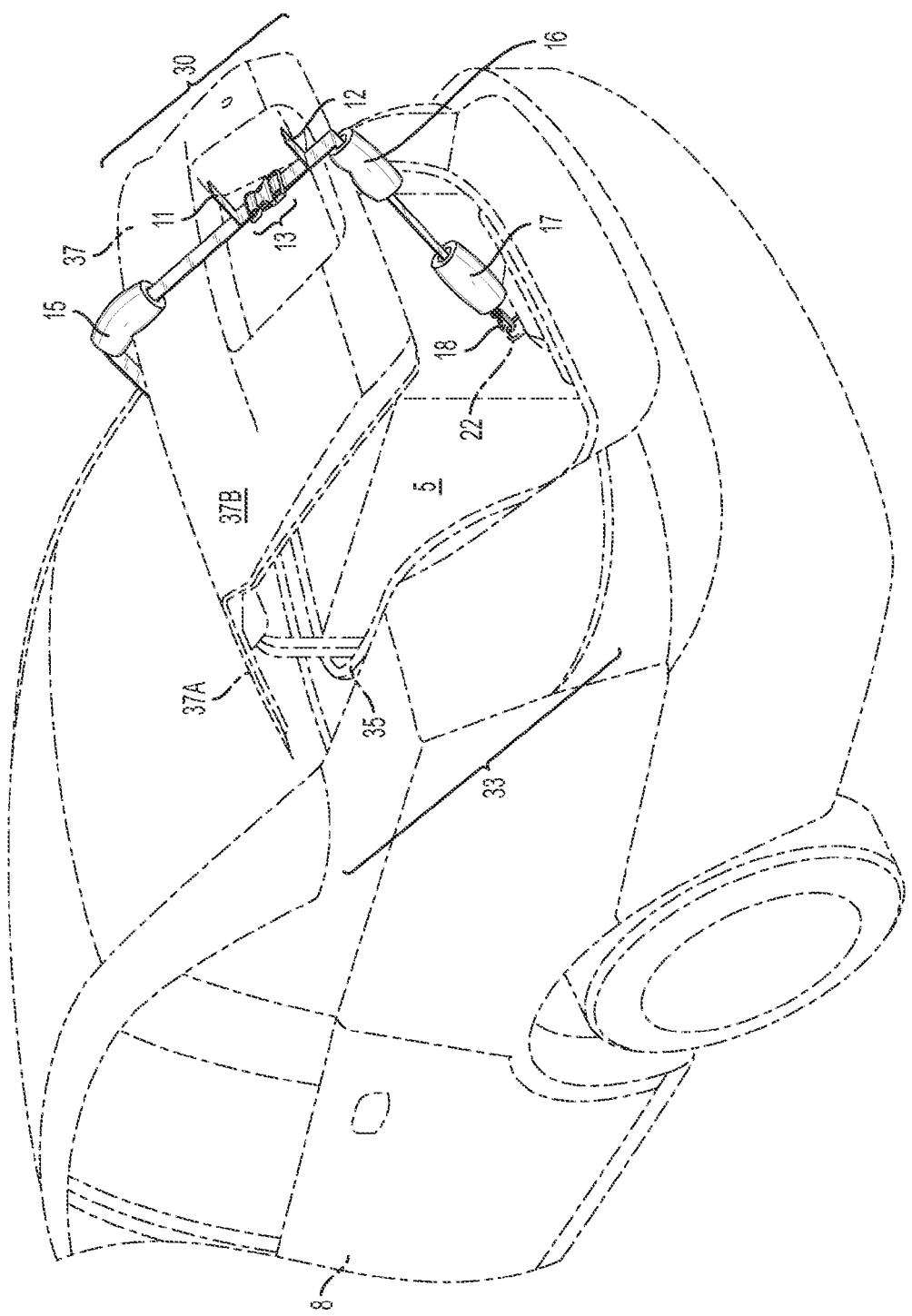
FIG. 8 depicts the vehicle tie-down device being employed to secure an oversized item within a vehicle trunk.

The cinching process at the buckle (13) also provides a means for buckle placement along the outside of the vehicle closure panel (30). By sizing each section (11, 12) of the strap appropriately, one can ensure that the buckle (13) is in a position that is substantially parallel to a portion of the vehicle closure panel (30). In one embodiment, a vehicle closure panel (30) is a trunk lid (37) that has a substantially horizontal surface (37A) and a vertical surface (37B) that encloses a vehicle storage compartment (the trunk (35)). Without limiting the invention, one useful position for the buckle (13) is shown in FIG. 8 as being substantially parallel to the vertical surface (37B) of the trunk lid (37). In general, the buckle (13) is more secure when it is adjacent a substantially flat portion of the vehicle closure panel (30) to avoid any arcing or torsion on the buckle connection.

As depicted in FIGS. 1-12, an exemplary vehicle tie-down device (10) according to the present invention includes first and second strap portions (11, 12). The first strap portion (11) connects to the grip (19), and the second strap portion (12) connects to the vehicle, typically inside the vehicle's storage compartment (33). The first (11) and second (12) strap portions may be constructed of any material that is strong enough to withstand the tensional forces of cinching about a vehicle closure panel (30). The material may be a polymer such as nylon or polyester, a web, an elastic material, woven or nonwoven fabrics, or any other material useful for forming straps. The straps may resist tensional forces or may stretch with the forces, depending on the use at hand. In one embodiment, the straps are formed of a material with reduced elasticity so that the tie-down device (10) does not allow a trunk lid to bounce up and down, as can occur when elastic bungee cords are used for hauling. Other embodiments may allow for such elasticity as necessary for particular purposes. For example, the invention encompasses the possibility that the tie-down device (10) incorporates springs as necessary to absorb and release kinetic energy. Generally, however, the strap portions (11, 12) may be constructed of many suitable banding or strapping materials known within the art.

With specific reference to FIG. 1, the first (11) and second (12) strap portions of the exemplary vehicle tie-down device (10) according to the present invention are connected at the buckle (13). As depicted, buckle (13) is a double adjustable, slide release buckle that includes male and female end portions (13A, 13B) connected to respective strap portions (11, 12). When the male (13A) and female (13B) end portions of buckle (13) are interlocked, a connection point is formed whereby the first (11) and second (12) strap portions are attached. In an exemplary embodiment, the male (13A) and female (13B) end portions of buckle (13) allow for adjustment of the length of the strap portions (11, 12).

The adjustable feature of the buckle (13) is designed to stop slippage once the strap portions (11, 12) are correctly sized for a particular vehicle. Those having skill in the art will appreciate that the adjustable connection point can alternatively be constructed utilizing cam buckles, a ratchet lock mechanism, or other types of adjustable securing means. Alternatively, the vehicle tie-down device (10) according to the present invention could be a one piece strap structure with adjustment points at any location between or at the ends of the strap structure.

With particular reference to FIG. 8, all points of attachment for the tie-down device (10), including the buckle (13), are accessible for easy reach by most users, whether the tie-down device (10) connected before or after the load (5) is in place. In using the tie-down device (10), the user does not have to reach into tight areas within a full cargo hold (35) of a vehicle (8) or squeeze cords and ropes into inaccessible portions of the vehicle. Instead, the tie-down device (10) provides a convenient, easy to reach adjustable connection point around the exterior of a vehicle (8) (about the trunk or rear hatch).

An exemplary vehicle tie-down device (10) according to the present invention may incorporate padded members (15, 16, 17) to protect a finish on the vehicle or hardware on the vehicle. The padded members may fit over the tie-down device (10) such that the padded members slide over the strap (14), but other embodiments may include sewing or otherwise incorporating padding onto the strap portions (11, 12). The padded members (15, 16, 17) may be any shape and made of any material (typically a soft material) that lifts the strap (14) off the vehicle closure panel (30) to prevent the strap (14) or its buckle (13) from scratching or denting the surface of the vehicle (8). The padded members (15, 16, 17) should be properly adjusted about the straps portions (11, 12) such that the padded members provide protection at points where the vehicle tie-down device (10) comes into contact with the vehicle surface. The padded members (15, 16, 17) also provide points within the structure of the tie-down device (10) that reduce tension on the buckle (13); the padded members absorb some of the tension on the tie-down device when the tie down device is stretched across a load. Once the user places the padded members in an optimal location, no further adjustment is necessary.

Figure 4:
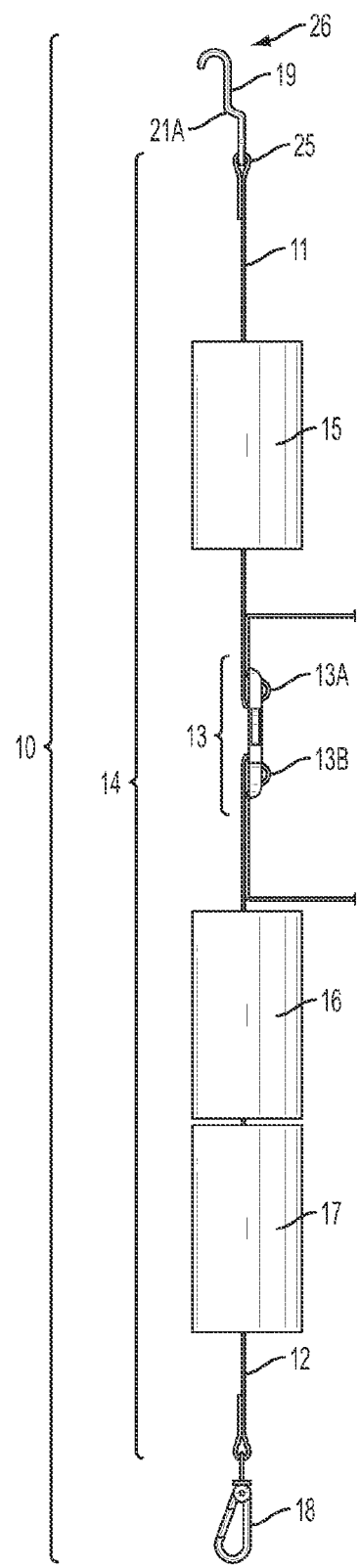
FIG. 4 is a side view of the vehicle tie-down device according to the present invention.
Figure 5:
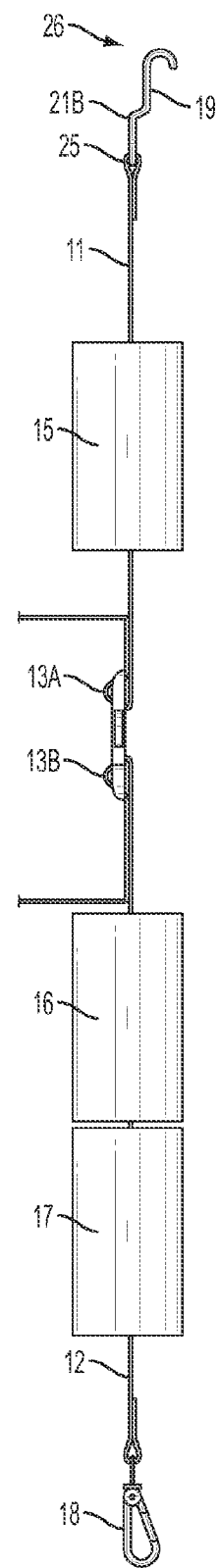
FIG. 5 is an opposing side view of the vehicle tie-down device according to the present invention.
Figure 6:
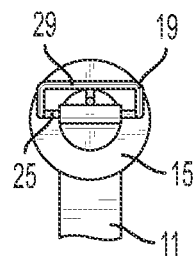
FIG. 6 is a top plan view of the vehicle tie-down device according to the present invention.
Figure 7:
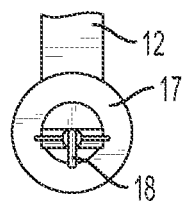
FIG. 7 is a bottom plan view of the vehicle tie-down device according to the present invention.
Figure 10:
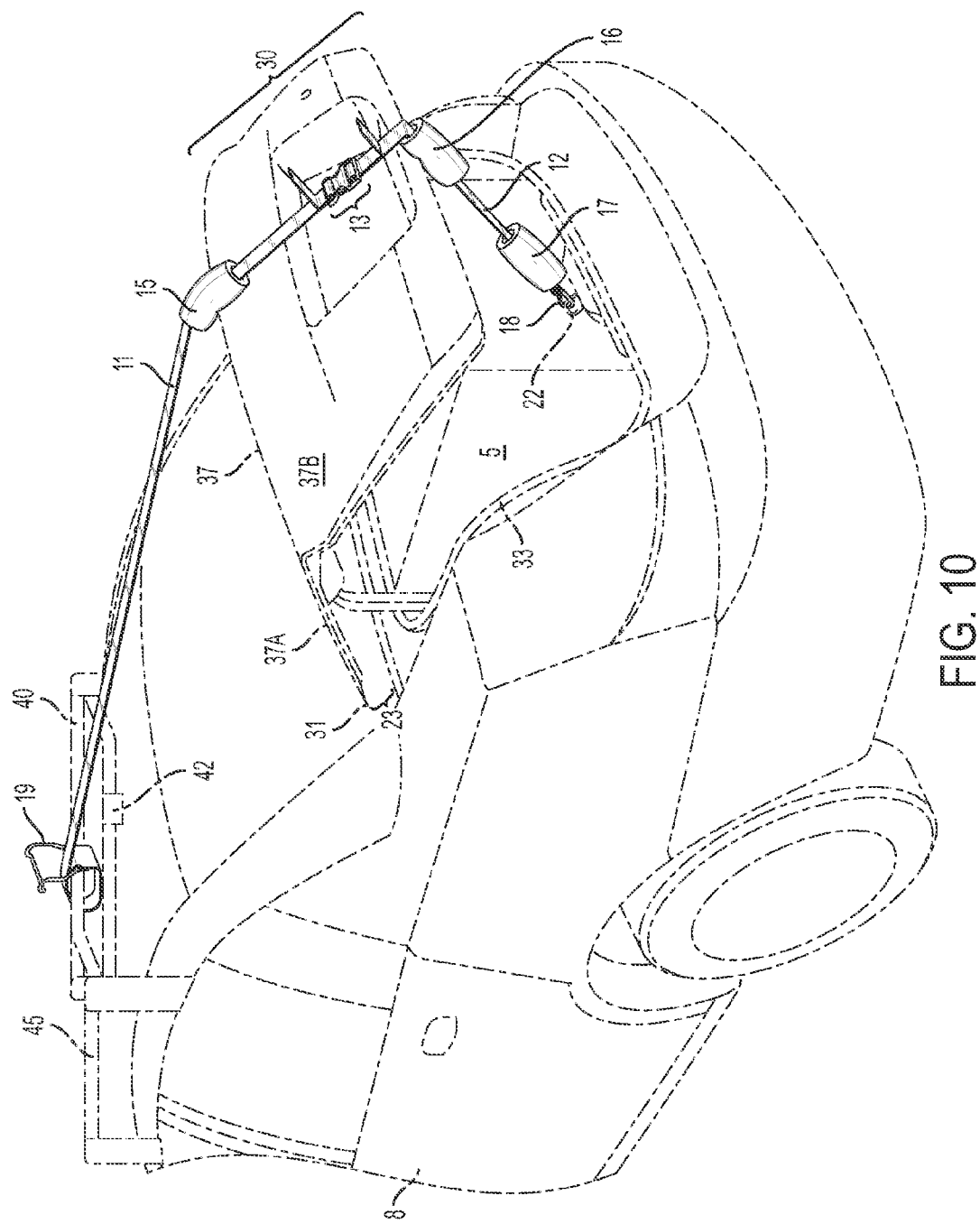
FIG. 10 depicts the vehicle tie-down device being employed to secure an oversized item within a vehicle trunk utilizing a vehicle roof mounted luggage rack having a cross-connector as an attachment point.
Figure 11:
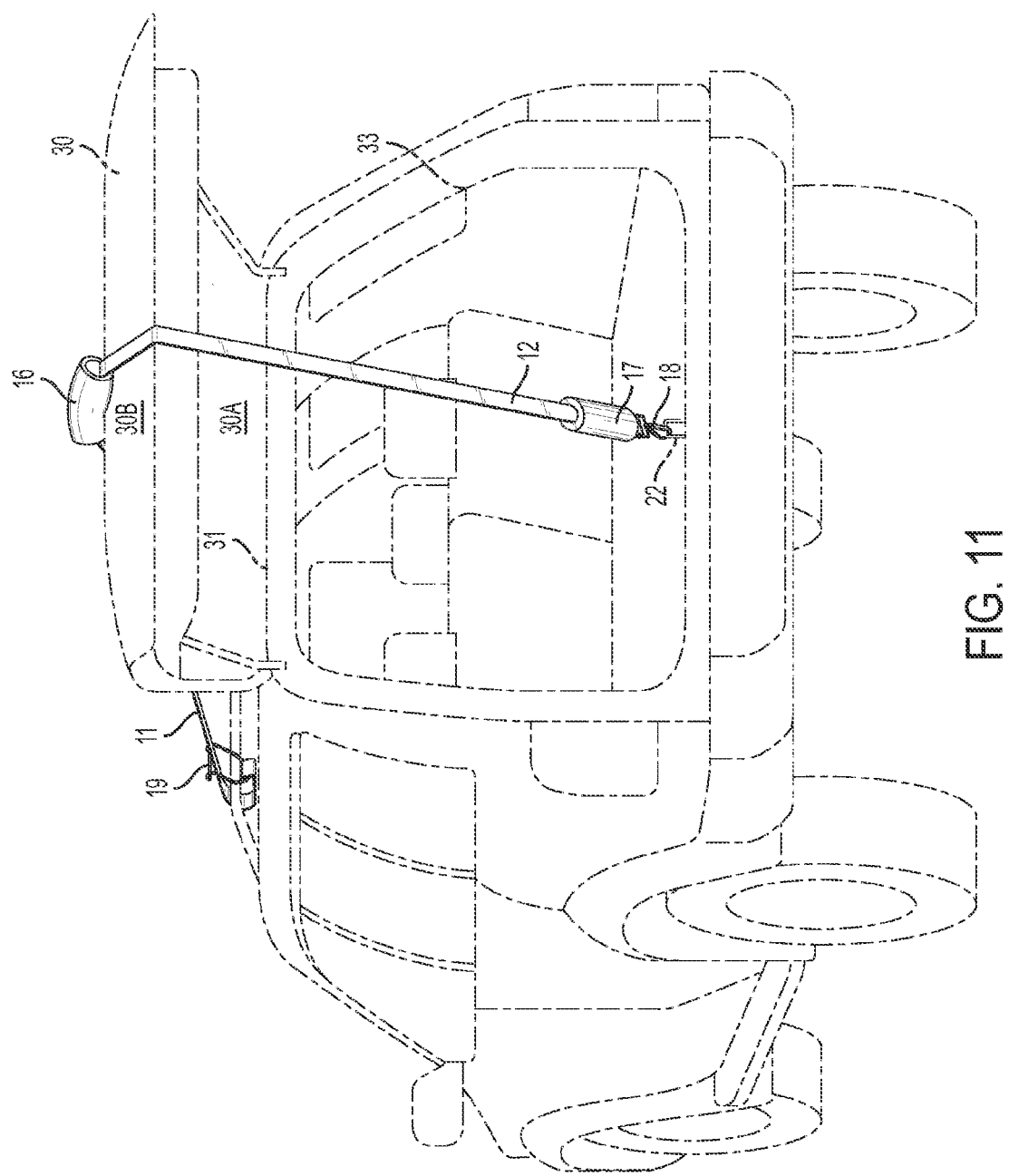
FIG. 11 depicts the vehicle tie-down device installed on an SUV and utilizing a vehicle roof mounted luggage rack as an attachment point.

The strap (14) connects to the vehicle (8) at both ends. The above described grip (19) connects one end of the strap (14) to the vehicle closure panel (30). At the opposite end of the strap is a latch (18), (e.g., a hook-shaped latch or swivel clip with a closure). Embodiments that divide the strap (14) into two portions (11, 12) have the grip (19) at a first end of the first strap portion (11) and a latch (18) connected to the second strap portion (12). With particular reference to FIGS. 1, 4, and 5, the latch (18) may be a slide type latch mechanism, a pinch clip, or any other kind of connector that fits the use at hand. As depicted at FIGS. 8, 10, and 11 the latch (18) attaches to a fixed attachment mechanism (22) within or on the vehicle (8) (e.g., a strike portion (22A) of a vehicle trunk or rear hatch lock assembly that is universal in most vehicles). Although a slide type or pinch clip latch mechanism may be utilized with regard to the vehicle tie-down mechanism according to the present invention, other fasteners known within the art may be substituted for the hook shaped latch (18).

The second strap portion (12) may also incorporate a respective padded member (17). With particular reference to FIG. 1, the protective padded member (17) may be adjusted about the second strap portion (12) to fit over latch (18). With particular reference to FIGS. 8, 10, and 11, the protective padded member (17) is adjusted to cover the latch (18) when the second strap portion (12) is installed. The protective padded member (17) functions to prevent the vehicle trunk lid or rear hatch from falling down onto the trunk strike portion (22A) when the latch (18) is in place. The padded member (17) therefore prevents accidental damage to the trunk lock mechanism.

As noted above, one end of the first strap portion (11) secures the grip (19). The grip (19) may be formed in part with a single piece pre-form (e.g., steel wire or a elongated section of polymer) that is adapted for shaping into the appropriate design for forming the grip (19). The grip may be formed in many ways, with bending the pre-form being one of many manufacturing techniques. Other grips (19) may be made in processes that include stamping, molding, extruding, or otherwise forming the grip (19) into a desirable shape. For embodiments of the grip utilizing a single piece body, the ends of a pre-form may be connected.

Figure 9:
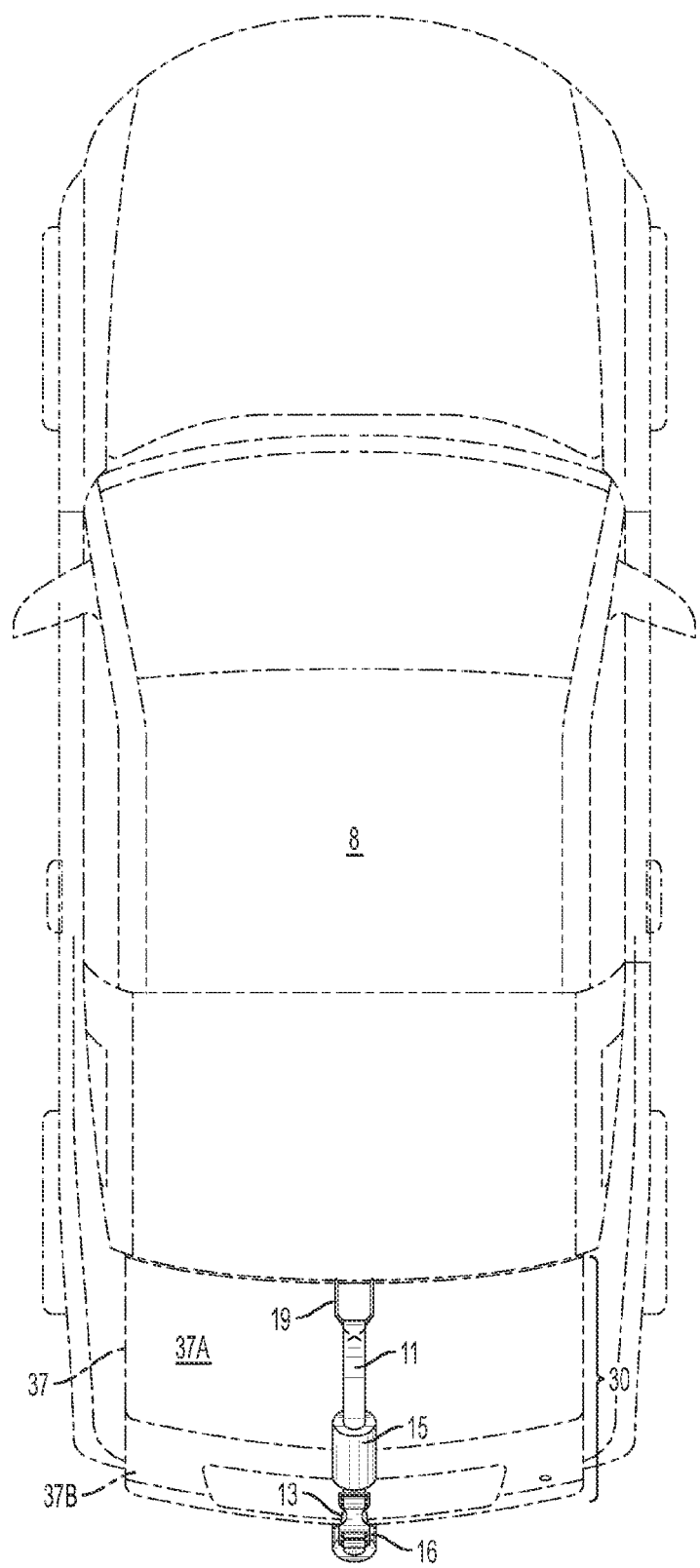
FIG. 9 is a top plan view of the vehicle tie-down device being employed to secure an oversized item or load within a vehicle trunk.

Generally, the grip (19) is designed with two curved shoulder portions (20A, 20B). The shoulder portions (20A, 20B) of the grip (19) are designed and specifically dimensioned to catch within a gap (23) that is formed about a hinged-edge portion of a vehicle trunk lid or rear hatch when the trunk or rear hatch is opened, as depicted at FIGS. 8 and 9. With reference to FIG. 1, a grip (19) has a broad, stable design such that the grip (19) does not slide or otherwise become dislodged during transport. The grip (19) may also be magnetized to further increase the stability of the grip (19) about the trunk or rear hatch edge during installation and during transport.

The grip (19) has inclined portions (21A, 21B) that are designed to keep the first strap portion (11) suspended and away from the vehicle surface in order to prevent chafing or scratching when the tie-down device (10) is installed and properly adjusted. Those having ordinary skill in the art will appreciate, however, that other embodiments of the grip (19) may not include, for instance, shoulder portions (20A, 20B) or inclined portions (21A, 21B) yet still serve as a grip according to the present invention.

In an exemplary embodiment, the grip (19) is an open construction (the body of the grip (19) defines an opening (27)) with a coating to protect the vehicle surface. Those having ordinary skill in the art will appreciate, however, that the grip (19) may be constructed from various materials and, as set forth above, may be formed using various designs. Significantly, whatever design specification the grip is constructed to meet, the grip should function to form a secure point of attachment about the edge (31) of a vehicle closure panel (30). The width of the grip (19) may be dimensioned to separate the shoulder sections (20A, 20B) and engage the vehicle closure panel (30) along a pre-defined width of an edge (31) of the vehicle closure panel (30). The pre-defined width of the grip (19) distributes the tensional forces pulling the grip against the vehicle closure panel (30), thereby assisting in preventing the grip from scratching or denting the vehicle.

In an alternate installation method depicted at FIGS. 10 and 11, the grip (19) may be attached to the roof mounted luggage rack of a vehicle. As depicted at FIG. 10, the grip (19) may be hooked around a horizontal cross connector (40) of the roof luggage rack (45) to create an attachment point for the vehicle tie-down (10). In one embodiment, the cross connector (40) may be another removable strap, as shown in FIG. 10, that loops around a fixture, such as the luggage rack (45), and buckles to form another place to attach the tie down device (10). The cross connector buckle (42) can be one of many kinds that are known in the art already. In this regard, the cross connector (40) is yet another accessory that can be quickly and easily connected or disconnected to an existing front-to-back luggage rack, providing an attachment point for the tie-down device (10). The cross-connector (40) may incorporate integral padding or padded members, such as those described above, to avoid scratching or otherwise damaging the vehicle roof. Again, the padded members would be placed and adjusted once without the need for additional adjustments during use.

The cross connector (40) may take on many different forms (e.g., straps, rods, single piece units, sectional units), and in exemplary embodiments, the cross connector (40) extends across the width of the vehicle, providing a secure attachment area for the tie-down device. FIG. 10 shows that the tie-down device (10) may loop through the opening (27) in the grip (19) to attach to this cross connector (40). This is useful for vehicle designs that do not allow sufficient space within the gap (23) between a vehicle closure panel (30) and the rest of the vehicle to fit the grip (19). The cross connector (40), therefore, is a value added accessory that allows the tie-down device (10) to be used with more kinds of vehicles.

As depicted at FIG. 11, the first strap portion (11) may also be looped through grip (19) and around a horizontal member of the roof luggage rack to create an attachment point for the vehicle tie-down (10). This allows use of a luggage rack having only front-to-back rails as a point of attachment for the tie-down device (10). FIG. 11 shows that using a luggage rack to hold the grip in place adapts the tie-down device for use with bigger, more rugged vehicles, such as a sports utility vehicle carrying a load. For drawing clarity, the load (5) is omitted from the drawing of FIG. 11, but it is understood that a vehicle of the kind shown would often be used for transporting oversized items. These alternate installation means and methods may be particularly advantageous for those vehicles that do not have a significant gap (23) at the hinged portion of the vehicle's trunk or rear hatch for installation of grip (19).

Figure 12:
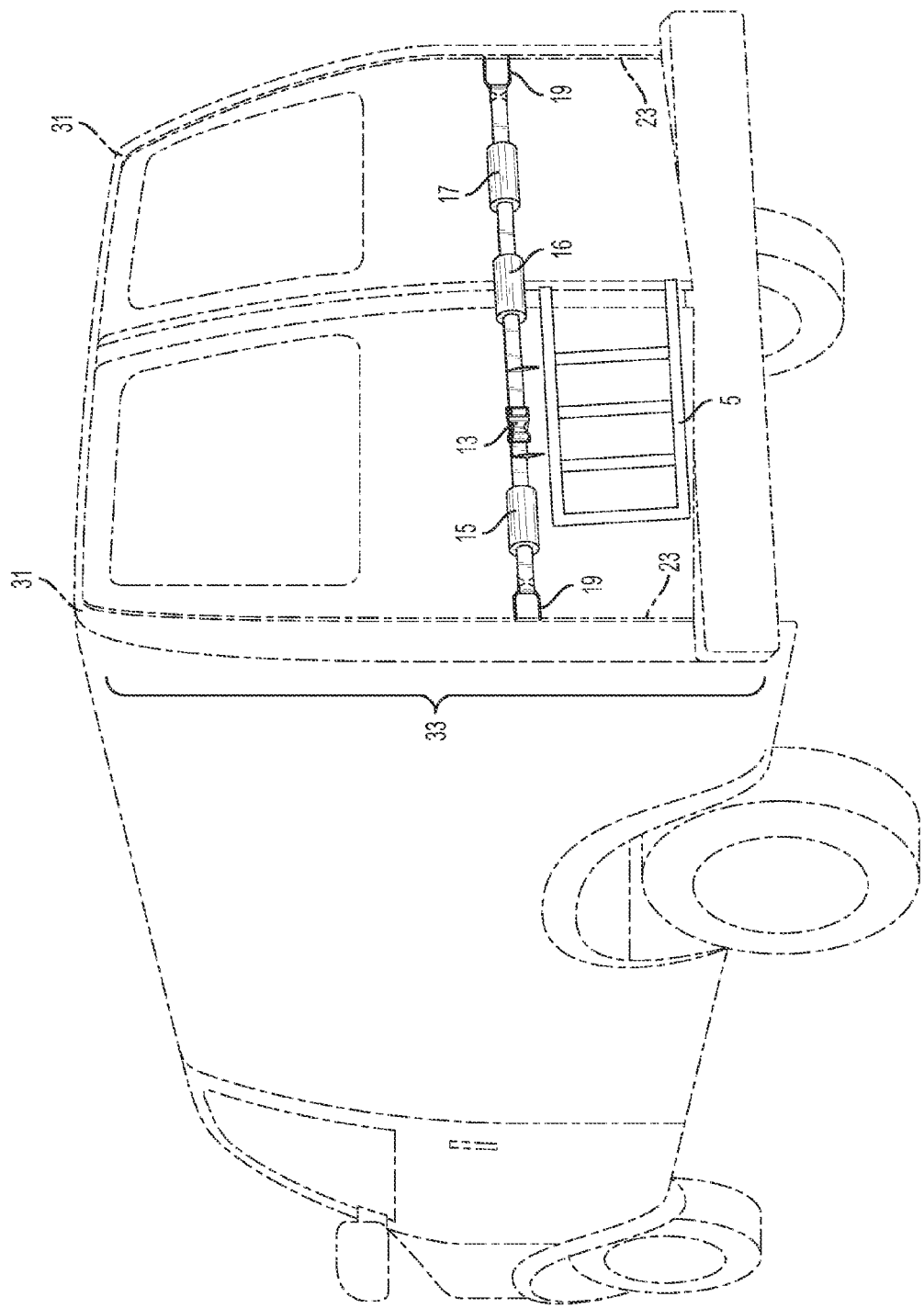
FIG. 12 depicts an alternate embodiment the vehicle tie-down device being employed to secure an oversized item within a cargo van.

In yet another alternate installation method depicted at FIG. 12, the vehicle tie-down (10) may be structurally modified such that it may be utilized on a cargo van with dual rear doors. In this alternate exemplary embodiment according to the present invention, the vehicle tie-down includes a grip (19) at both ends of the vehicle tie-down device such that both grips can be secured within the void space (23) that is created when the respective dual closing rear doors are opened. As in the first exemplary embodiment, an adjustable connection point is incorporated to properly adjust the vehicle tie-down device (10) and secure the load. Further, padded members serve to prevent chafing and scratching on the vehicle surface.

To avoid duplicative manufacturing, the vehicle tie-down device according to the alternate embodiment depicted at FIG. 12 may be marketed in a combination pack with two complete vehicle tie-down devices in the pack. In the first unit, a segment of the device may have a grip (19) opposite a male end (13A) of a buckle (13) and the other segment of that unit would have a latch (18) opposite a female end (13B). The second tie-down device in the pack would have one segment with a grip (19) and a female end (13B) to be paired with a latch (18) having a male end. The user may then mix and match the segments of two different tie-down devices to form the alternate embodiment depicted at FIG. 12. The invention is also adapted to form a tie-down device that has other attachment points at both ends (i.e., a latch or clip at both ends with no grip used).

The foregoing vehicle tie-down devices and methods of using the vehicle tie-down devices allow for oversized items and loads to be secured within the trunk or rear storage compartment of a vehicle more rapidly and with less effort than with traditional methods, such as utilizing elastic bungee cords, strapping material, rope, or twine. As noted above, the tie-down device (10) is characterized in part by its ease of connecting and disconnecting for fast and easy installation to carry a load and removal after use. Moreover, the present invention has advantages and structural design features not previously incorporated into prior devices designed to secure oversized items or loads within a vehicle trunk. For example, the tie-down device (10) may include reflectors or reflective fabrics for additional safety when moving a load at night.

Figure 13:
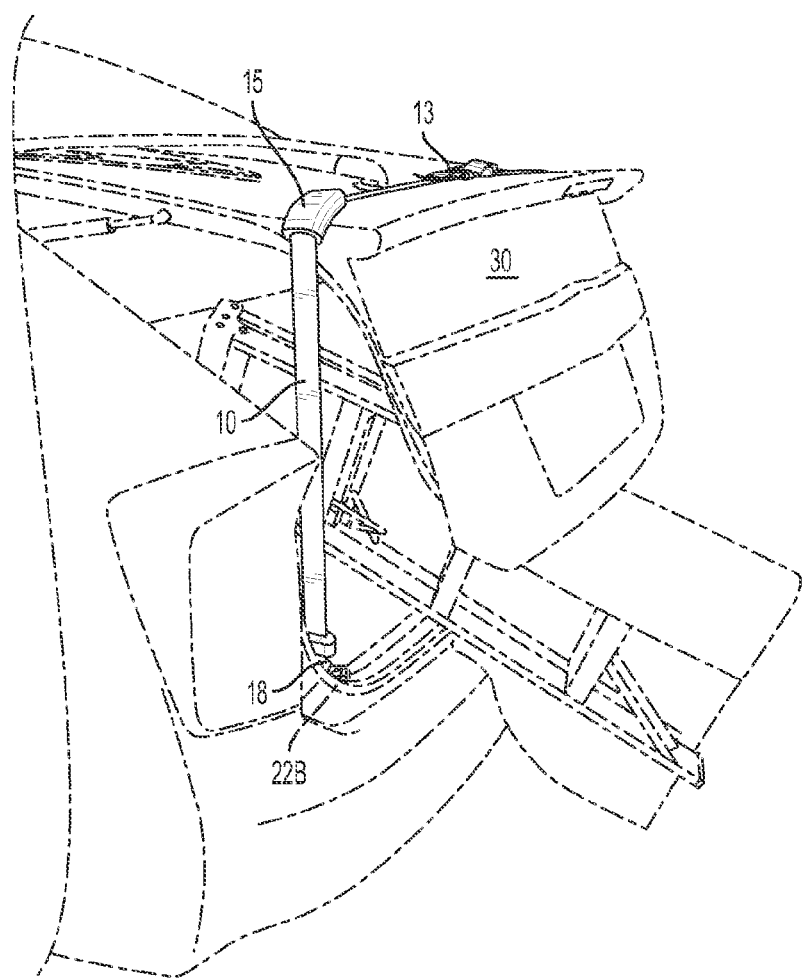
FIG. 13 depicts a side perspective view of an embodiment of the invention utilizing latches at opposite ends of the tie down device holding down a hatch back style trunk closure.
Figure 14:
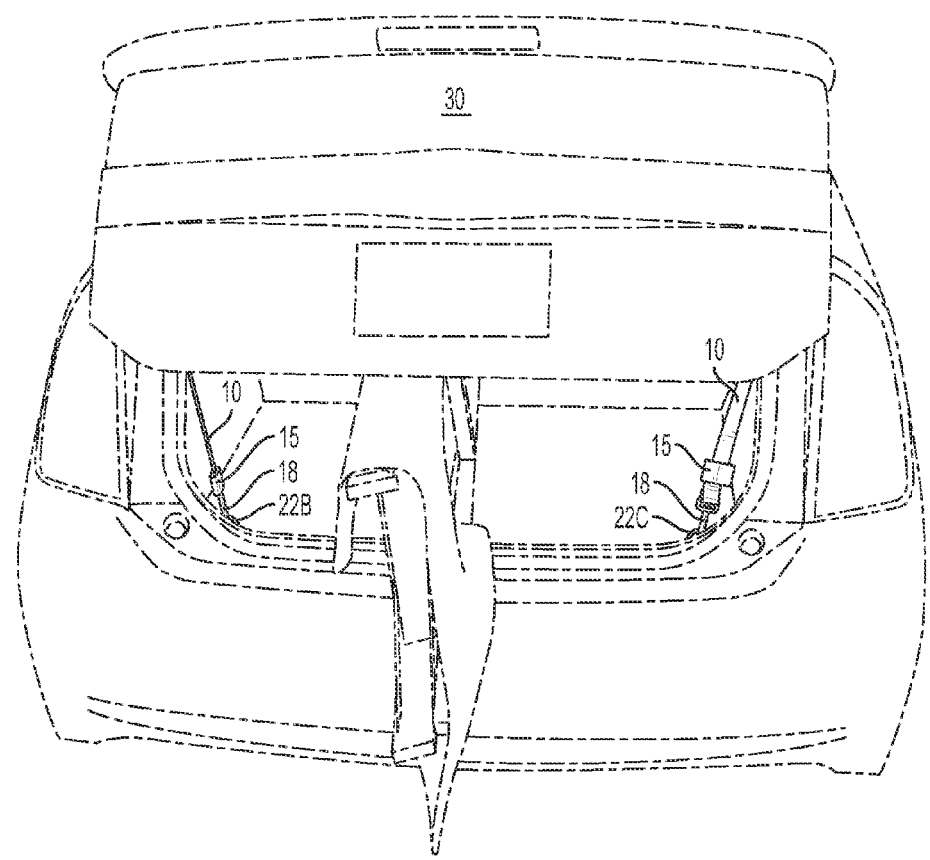
FIG. 14 depicts a rear elevation view of the embodiment of FIG. 13.
Figure 15:
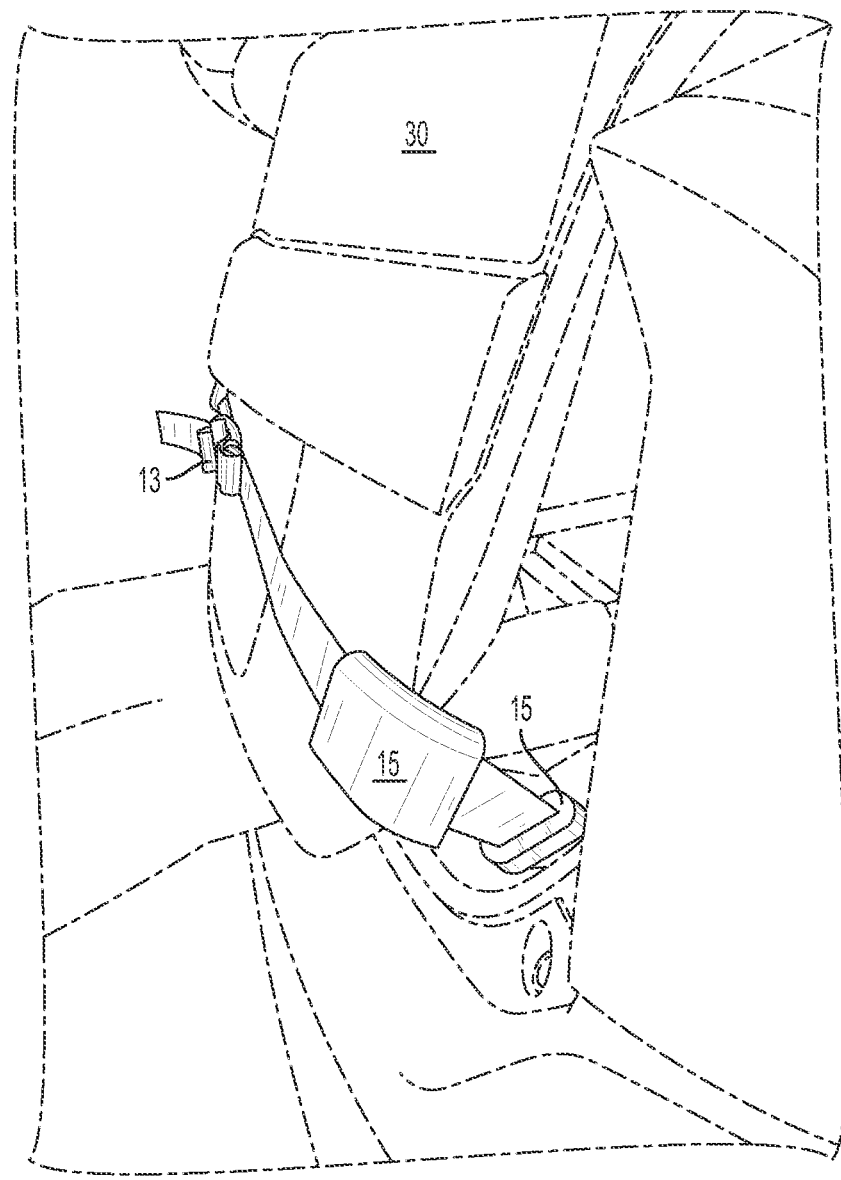
FIG. 15 depicts a side perspective view of the embodiment of FIG. 13 with the tie down device extending across the back of trunk closure.

FIGS. 13 to 17 show additional modifications to the tie down device (10) in use with different kinds of vehicle closure panels (30). Many vehicles have multiple points of attachment within the storage area of the vehicle. These interior fixed attachment mechanisms (22B, 22C)) may be equidistant and in addition to a trunk strike (22A). All of the fixed attachment mechanisms (22) provide convenient points for attaching the tie-down device (10), particularly when the tie down device incorporates latches (18) at opposite ends (i.e., both ends have the same kind of latch (18) instead of the above described grip (19) at one end). These latches may be any kind of adjustable and removable fasteners such as slide hooks, clips, hook-shaped latches, or swivel clips with respective components that open and close around the fixed attachment mechanisms (22). In FIGS. 13 and 14, the latches (18) allow for extending the tie-down device (10) over and around the vehicle closure panel (30) with the latches attaching to fixed attachment mechanisms (22B, 22C) on either side of the storage compartment. In FIG. 15, the tie-down device extends across a front face of the vehicle closure panel (30) and attaches at each end to fixed attachment mechanisms (22B, 22C). In a different embodiment, not shown in the figures, the tie down device (10) with latches at opposite ends could also wrap around the exterior of the vehicle closure panel and connect with both latches (22B, 22C) affixed to the trunk strike (22A). Finally, the tie down device (10) may utilize oppositely positioned fixed attachment mechanisms (22B,22C) within the vehicle storage area to attach latches (18) on either end of the tie-down device (10). Instead of the previously described buckle (13), the tie-down device may have a sewed upper strap creating a "suspenders style" embodiment such that strap sections create a Y shaped device connected to the vehicle at three attachment points.

Figure 16:
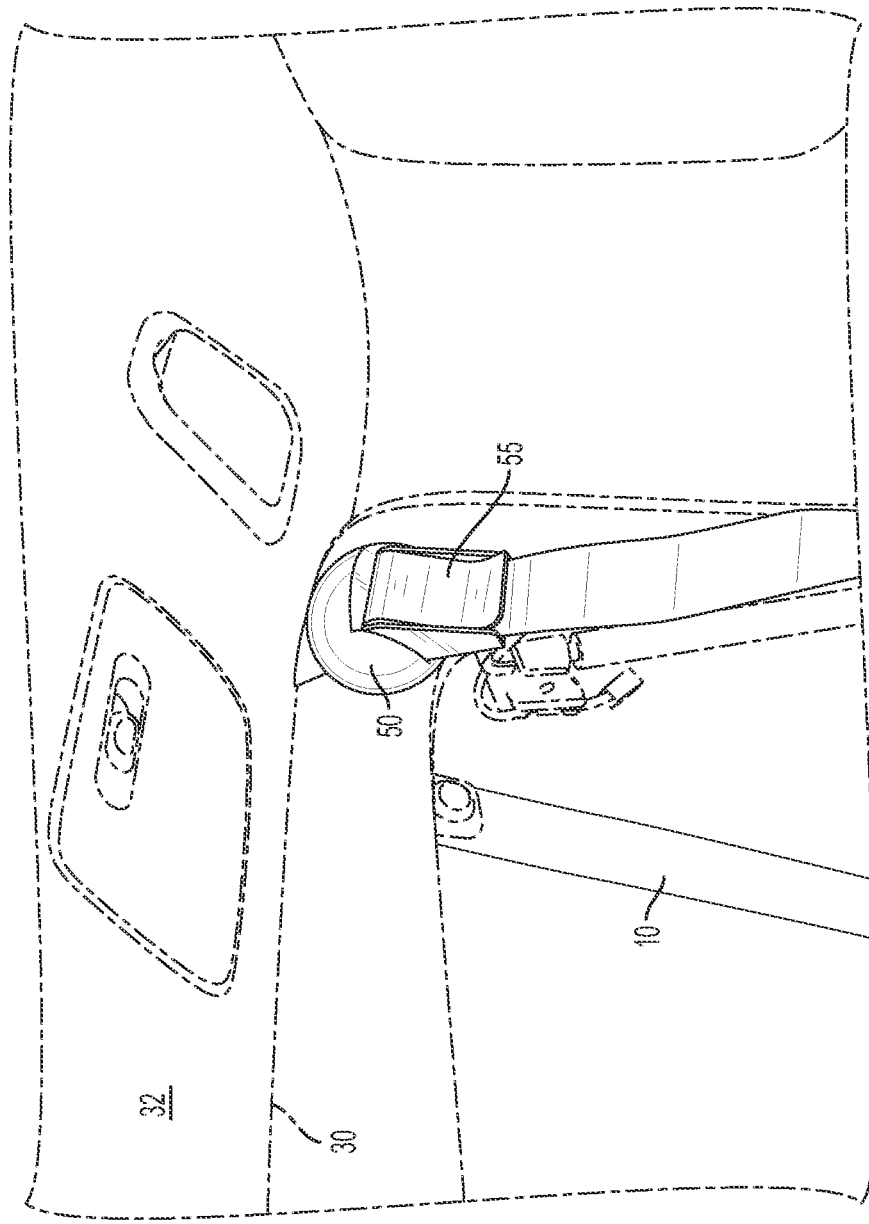
FIG. 16 depicts a perspective view of an embodiment of the tie down device with an interior bracing structure that is spherical and removable from the tie down device.
Figure 17:
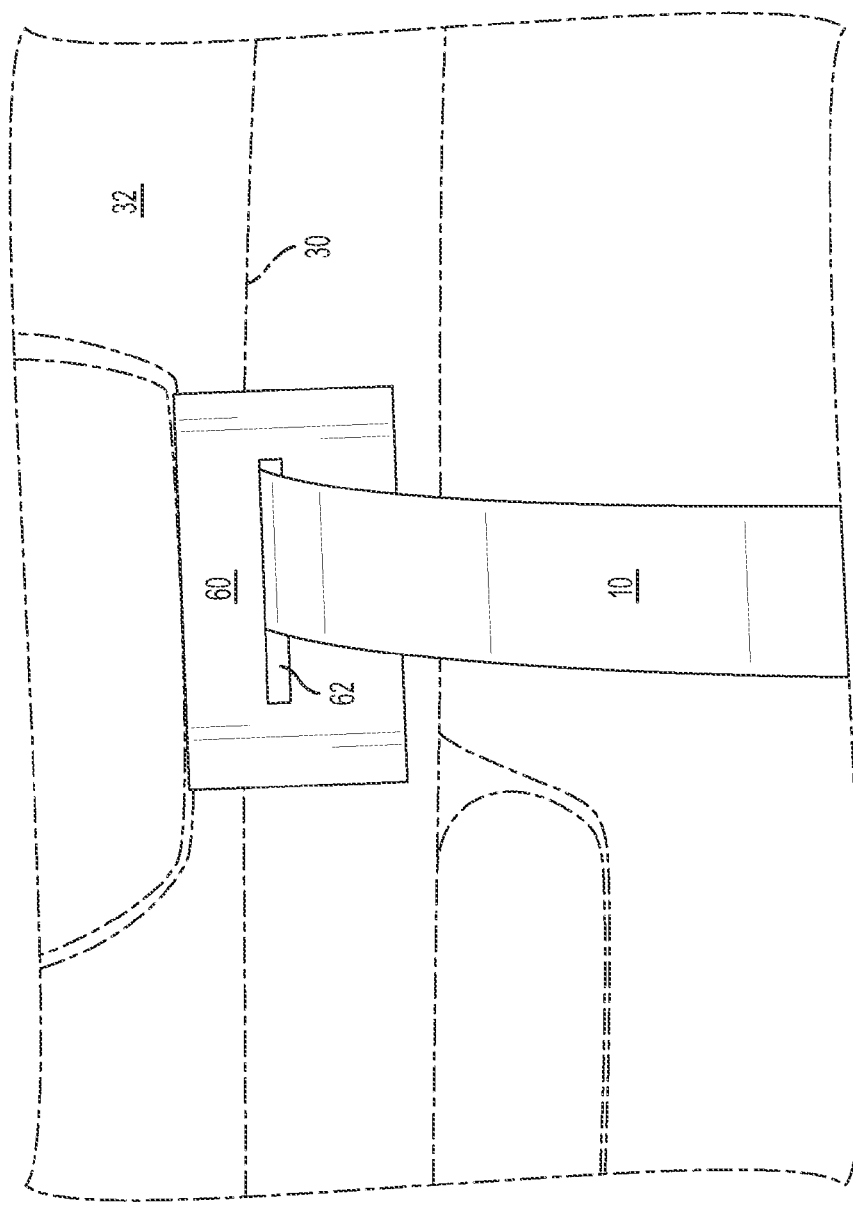
FIG. 17 depicts a perspective view of an embodiment of the tie down device with an interior bracing structure that is flat and removable from the tie down device.

FIGS. 16 and 17 illustrate embodiments of the tie-down device (10) having attachments at one end that allow for the tie down device to slide between the vehicle closure panel (30) and the roof (32) of the vehicle. The space between an open (i.e., lifted) vehicle closure panel (30) and the roof of the vehicle may be narrow to the point of not accommodating the above described grip (19). In this case, the invention described herein encompasses embodiments of the tie-down device (10) in which one end slides within the space between the vehicle closure panel (30) and the vehicle roof (32). In a first embodiment, the tie down device may include a strap section (11) with no grip (19) or other attachment or latch (18). In this embodiment, the end of the strap section (11) may be coated and/or heat cut so that one end of the strap section (11) is thin but stiff and easily inserted into the above described space between the vehicle closure panel (30) and the vehicle roof (32).

In a different variation shown in FIGS. 16 and 17, the end of the strap section (11) inside the vehicle is held in place by an interior bracing structure (50, 60) that fits against the vehicle closure panel (30) to ensure that the strap section (11) does not slide back through the space between the vehicle closure panel (30) and the vehicle roof (32).

In the embodiments of FIGS. 16 and 17, the bracing structure (50, 60) is attachable to and detachable from the strap section (11). In operation, after sliding the strap section (11) into the interior of the vehicle, the user slides the strap section (11) through the bracing structure (50,60) and secures the bracing structure (50,60) with a locking device (55). The locking device (55) prevents a strap section (11) from sliding back out of the bracing structure (50, 60). The figures show the bracing structure as a cushioned sphere (50) or a slotted, flat card (60), but other bracing structures are within the scope of the invention (e.g., the strap (11) may define a button hole or other opening through which a rod slides to hold the strap section (11) in place).

Yet another variation of the bracing structure is one in which the end of the strap section (11) incorporates a flattened loop of fabric or other material that fits within the space between a vehicle closure panel (30) and the roof of the vehicle (32). Once inside, the loop can be opened to slide there through any desirable bracing structure that holds the strap section (11) within the vehicle.

All of the variations of end attachments described herein may be combined as necessary for the given application (i.e., the device is sufficiently modular to allow for attaching the bracing structures (50, 60) to any other embodiment via a removable universal connector). In this regard, the buckle (13) may be a universal connector of any type that allows for connecting and disconnecting strap sections (11, 12) to one another. The strap sections (11, 12) may terminate at respective ends with any of the above described grips, latches, bracing structures, or combinations of the same. The tie down device (10) may be segmented with additional intermediate buckles (i.e., strap portions (11, 12) may have additional divisions that allow for adding and removing various kinds of end attachments).

In accordance with the above description of the tie-down device, the invention encompasses a method of tying down a vehicle closure panel (30) attached to a storage compartment (33) in a vehicle (8). In this regard, the method includes the following steps: (i) attaching a first strap portion (11) to an outer edge (31) of a vehicle closure panel (30) such that the first strap portion (11) is positioned over the vehicle closure panel (30); (ii) cinching the first strap portion (11) to a desired length via a buckle (13) attached to the first strap portion; (iii) connecting a second strap portion (12) to the buckle at one end and to the vehicle (8) at an opposite end of the second strap portion, such that said second strap portion is positioned over the vehicle closure panel and extends into the storage compartment (33) of the vehicle; (iv) cinching the second strap portion to a desired length via said buckle. This method of tying down a vehicle closure panel (30) is clearly adaptable as necessary for use with many different varieties of tie-down devices disclosed in this specification.

In other methods of using the tie-down device (10), the steps described above may be in more particular orders for different users. For example, it is within the scope of the disclosed tie-down device (10) to attach the strap sections (11, 12) prior to moving the load (5) into the vehicle (8). In this order of operations, the user would then close the buckle (11, 12) about the vehicle (8) and cinch the straps (11, 12) last.

As another example of the order of attaching the tie-down device (10), the user could determine that the load (5) will hinder accessing the fixed attachment mechanism (22) within the storage compartment (33). Accordingly, the user could begin the installation process by attaching the lower strap (12) first, before placing the load into the vehicle. In this method of use, the user would then attach the upper or first section (11), buckle the sections and cinch the sections to the appropriate length.

Although not shown in the drawings, the tie-down device (10) may be dimensioned to wrap around a load within a vehicle before connecting each end of the tie-down device (10). The device (10), therefore, can be sized to connect or loop around the load (5) or extend through openings in the load for a more secure assembly. The use of a buckle (13) that allows cinching different sections of the strap (14) ultimately provides a more secure hold for cargo than hand-tied knots or bungee cords.

In the specification and/or figures, typical embodiments of the invention have been disclosed with respect to securing oversized items or loads within a vehicle trunk or rear storage compartment. The present invention is not limited to such exemplary embodiments. Those having skill in the art will recognize that the invention may be readily modified for use on other vehicles or vehicle configurations not specifically described herein. For example, the tie-down device could be used on the hood of a vehicle to hold the hood down as may be necessary if a hood has been damaged or if a car is being towed for service. Unless otherwise noted, specific terms have been used in a generic and descriptive sense and not for purposes of limitation.

The invention claimed is:

1. A system for securing a load within a storage compartment of a vehicle that has a vehicle closure panel for providing access to the storage compartment, the closure panel having a hinged edge that lifts the closure panel away from the vehicle and forms a gap adjacent to the hinged edge when the vehicle closure panel is opened, the system comprising:
    a tie-down device, comprising:
        (i) a bracing structure configured to brace against the hinged edge of the vehicle closure panel proximate the gap that forms when the vehicle closure panel is opened, wherein the bracing structure allows the vehicle closure panel to substantially open and close without interfering with the vehicle closure panel's freedom of movement;
        (ii) a fastener; and
        (iii) a strap having a first end that is connected to the bracing structure and a second end that is connected to the fastener;
    wherein the tie-down device is configured to secure the vehicle closure panel in close proximity to the load when the bracing structure is braced against the hinged edge of the closure panel, the strap is extended over the closure panel, and the fastener is attached to the vehicle.

2. A system according to claim 1, wherein the bracing structure is removable.

3. A system according to claim 1, wherein the strap slides within a space defined between the vehicle closure panel and the rest of the vehicle.

4. A system according to claim 1, wherein said bracing structure holds a portion of said strap within the vehicle.

* * * * *